Aug. 11, 1964 A. GOY 3,144,116

FEEDING MECHANISM FOR TYPEWRITING MACHINES

Filed May 19, 1961 8 Sheets-Sheet 1

INVENTOR.
ANDOR GOY
BY Irwin S. Thompson
ATTY.

Aug. 11, 1964 A. GOY 3,144,116

FEEDING MECHANISM FOR TYPEWRITING MACHINES

Filed May 19, 1961 8 Sheets-Sheet 2

INVENTOR.
ANDOR GOY
BY
Irwin S. Thompson
ATTY.

Aug. 11, 1964 A. GOY 3,144,116

FEEDING MECHANISM FOR TYPEWRITING MACHINES

Filed May 19, 1961 8 Sheets-Sheet 3

INVENTOR.
ANDOR GOY
BY
Irwin S. Thompson
ATTY.

Aug. 11, 1964 A. GOY 3,144,116

FEEDING MECHANISM FOR TYPEWRITING MACHINES

Filed May 19, 1961 8 Sheets-Sheet 4

INVENTOR.
ANDOR GOY
BY
Irwin S. Thompson
ATTY.

Aug. 11, 1964 A. GOY 3,144,116
FEEDING MECHANISM FOR TYPEWRITING MACHINES
Filed May 19, 1961 8 Sheets-Sheet 5

INVENTOR.
ANDOR GOY
BY
Irwin S. Thompson
ATTY.

INVENTOR.
ANDOR GOY
BY Irwin S. Thompson
ATTY.

Aug. 11, 1964 A. GOY 3,144,116

FEEDING MECHANISM FOR TYPEWRITING MACHINES

Filed May 19, 1961 8 Sheets-Sheet 7

INVENTOR.
ANDOR GOY
BY
Irwin S. Thompson
ATTY.

INVENTOR.
ANDOR GOY
BY
Irwin S. Thompson
ATTY.

3,144,116
FEEDING MECHANISM FOR TYPEWRITING MACHINES

Andor Goy, 23 Dobsinai-ut, Budapest, Hungary
Filed May 19, 1961, Ser. No. 111,305
5 Claims. (Cl. 197—84)

Controlling devices for typewriters are known which allow the incorporation of three to four letter spacings and therefore are capable of working with three to five different carriage steps. The appearance of a typescript produced by a typewriter with such types resembles somewhat that of a letter press.

In order to produce a sheet typed by a typesetting typewriting machine that not only resembles but is practically identical with a letter press, there has to be made provision in a typesetting typewriter for the use of as many type widths as are used in a letter press.

In the art of printing, the width of a letter is measured by a standard which is represented by a period (mark) which is 1/2660 m. or 0.3759 mm. wide. It is therefore necessary that the carriage in a typesetting typewriter be capable of stepwise advancing by a width which corresponds as near as possible to the smallest step used in the letter press, the period width, in order that the typesetting typewriter may produce a typescript that corresponds to or resembles as much as possible a product of the letter press.

A further requirement of such a device is that these small type widths and stepped advances respectively can be increased by period units up to the largest width of the alphabet.

The Hungarian Patent No. 142,252 proposes an arrangement which on the face of it could result in 8 different width units for the types of a typesetting typewriter. As the narrowest type consists of 2- to 3-width units, this proposal should make possible the use of six to seven widths of type. Experiments have, however, shown that this proposal does not allow the quick and trouble-free use of 8 different widths of typesetting, but only up to 6 different widths of typesetting. These functional shortcomings are caused by the fact that the feed pawl of the control device for the advance of the carriage moves tangentially to the escapement wheel, that is, it is moved in a straight line during the setting of the unit width. The pivoted pawl could therefore only enter with its tip into the gaps of the escapement wheel and was squeezed therein at the extremity of the lift.

It has also been previously proposed to pivot the feed pawl on the spindle of the escapement wheel and thus obtain a standard unit movement of the pawl at the center of the escapement wheel. As the rotation of the escapement wheel is independent of the pivoting of the feed pawl and because the escapement wheel has to be rotated in the opposite direction from time to time, this adversely affects the pivoting movement of the powl due to the effects of the friction, and the necessary speed and precision of the feed pawl movement cannot be obtained. Feed pawls with such types of pivoting movement have therefore been proposed only for typesetting typewriters with coarse unit spacing, say 3 or 4 units, and they were not acceptable even under such conditions.

The feed pawl according to this invention, the application for which is a continuation-in-part of application Serial No. 667,226, filed June 21, 1957, now abandoned, has a pivot point which coincides with the axis of the shaft of the escapement wheel, while the journal for the pivot of the feed pawl remains independent of the shaft of the escapement wheel and therefore remains substantially independent of its rotation. The journal for the feed pawl is mounted on a convenient part of the typewriter frame.

A stop member or stop face carried by the pawl cooperates with one of a number of stops which are adapted to be moved selectively into the path of the stop face of the pawl by the depression of one of the type levers or of the spacer levers of the typewriter through the interaction of combs and link bridge members in the form of double crank levers. Further details of the invention can be gathered from the illustrated embodiments.

Figure 1:
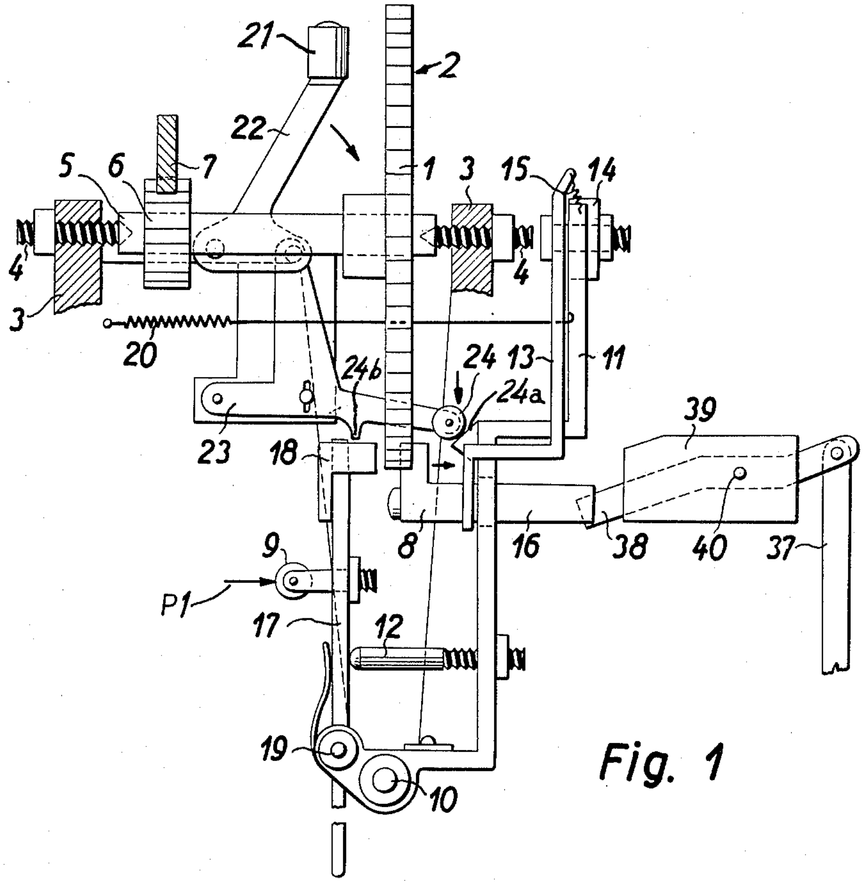
FIG. 1 illustrates a side view and a part sectional view of the feeding mechanism.
Figure 2:
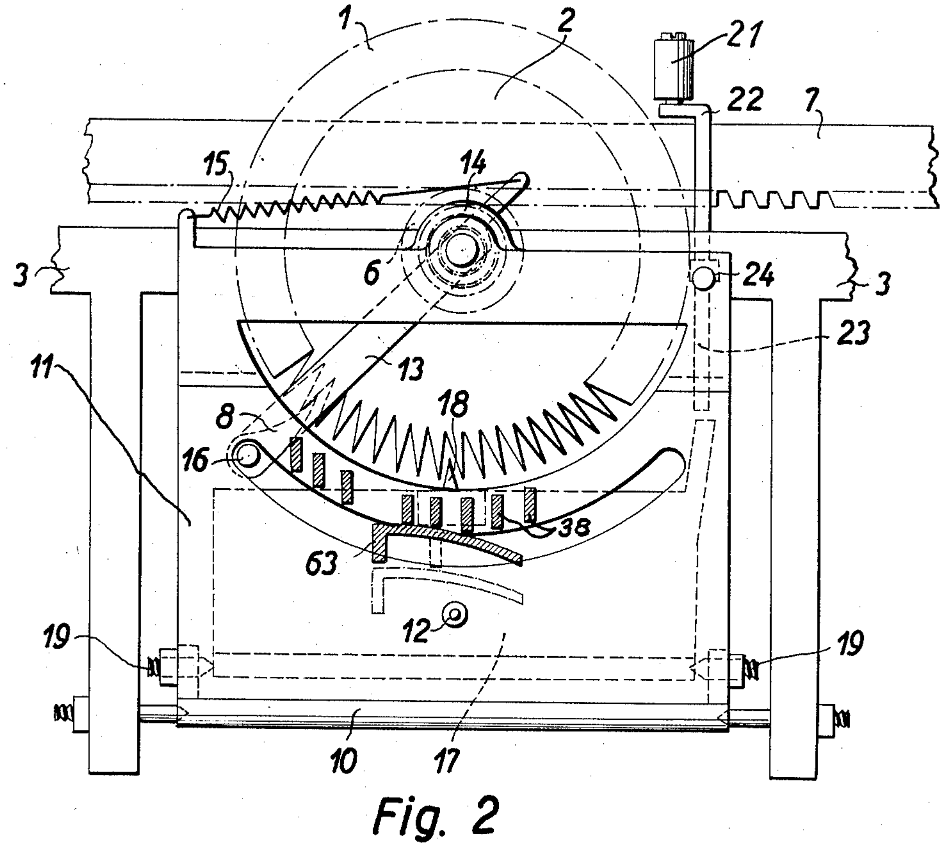
FIG. 2 is the corresponding sectional front view of FIG. 1 through a plane cutting through the stops.

Referring to FIGS. 1 and 2, the escapement wheel 2 with teeth 1 is keyed to shaft 5 which is rotatably journalled on spindles 4 mounted in frame 3. A pinion 6 in mesh with rack 7 is also fixedly mounted on shaft 5. The pitch of the escapement wheel 2 and that of the pinion 6 is so designed that the rotation of wheel 2 by one tooth corresponds to the feed or advance of the rack 7 and therefore of the paper carriage through the pinion 6 by the smallest unit width, preferably by 0.38 mm. This unit width can be increased or even decreased according to this invention. It should be mentioned here that according to prior proposals, the minimum advance was a multiple of this value, such as 0.7 mm.

The escapement wheel is held against rotation by the feed pawl 8 when the device is at rest. The device becomes actuated when the roller 9 (FIG. 1) is moved from its position of rest through depression of one of the type keys or the spacer key of the typewriter. The pawl carrier 11 pivoted at its lower end on spindle 10 carries feed pawl 8 and the adjustable screw 12 acting as a spacing member. A dog carrier 17 is pivotally mounted on axis 19 and has roller 9 secured thereto. Carrier 11 will be swung so that feed pawl 8 frees the escapement wheel when roller 9 is moved in the direction of the arrow P1. The feed pawl 8 is mounted on one end of arm 13 which has its other end pivoted on an antifriction bearing 14 which is fixed on carrier 11. A spring 15 is connected between a portion of arm 13 above its pivot and carrier 11. After being removed from the escapement wheel, pawl 8 is pivotally moved counterclockwise by the action of arm 13 and spring 15 until stop member or stop face 16 in the form of a bolt contacts one of the stops 38 described hereinafter. The dog 18 mounted on carrier 17 pivots on shaft 19 at right angles to the axis of wheel 2 at the same time as feed pawl 8 is pivoted and enters between the teeth of escapement wheel 2 as the feed pawl 8 is disengaged from escapement wheel 2. The carrier 11 for feed pawl 8 is returned to its initial position by spring 20 when roller 9 is returned to its position of rest as the type key is moved upwards.

A rack-release lever is actuated when the rack 7 is to be freed from the feeding device. The double lever 22 provided at its upper end wth a roller 21 is then pivoted to the right (see arrow in FIG. 1) and carries the pivoted lever 23 with it in the same direction. A roller 24 carried by one arm of lever 23 cooperates with the inclined surface of element 24*a* of the carrier 11 of the feed pawl 8 and moves it so that the feed pawl is disengaged from the escapement wheel. Lever 23 carriers a lug or lip 24*b* intermediate of its end which is moved at the same time to come between the upper end of carrier 17 and wheel 2, thus preventing dog 18 from entering between the teeth of escapement wheel 2. In this way escapement wheel 2, pinion 6 and rack 7 are freed from the restraint of the feeding device and can be moved to any desired position.

Figure 3:
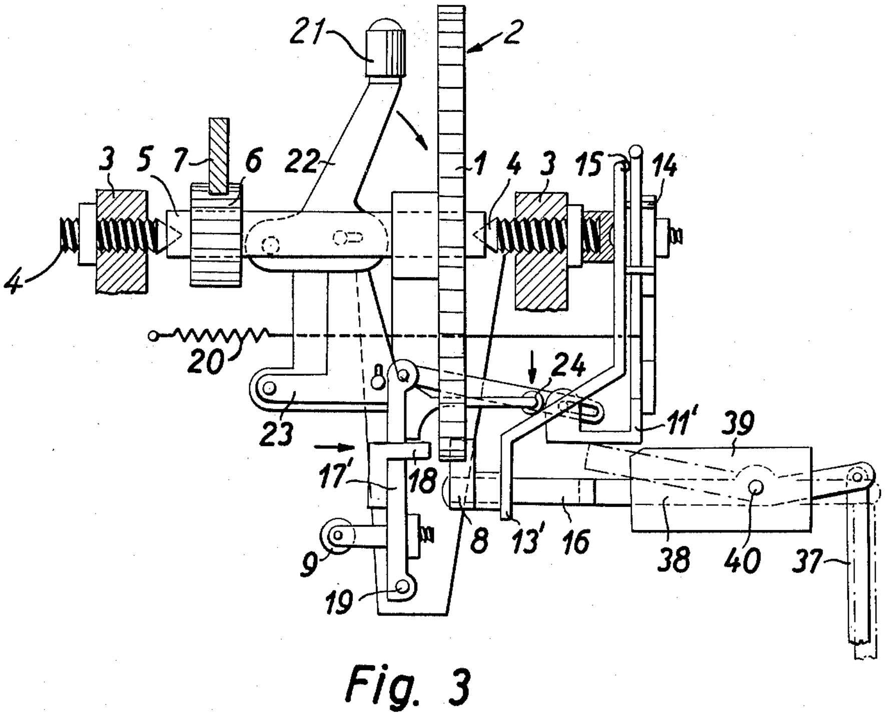
FIG. 3 illustrates a side view of another embodiment and a part sectional view thereof.
Figure 4:
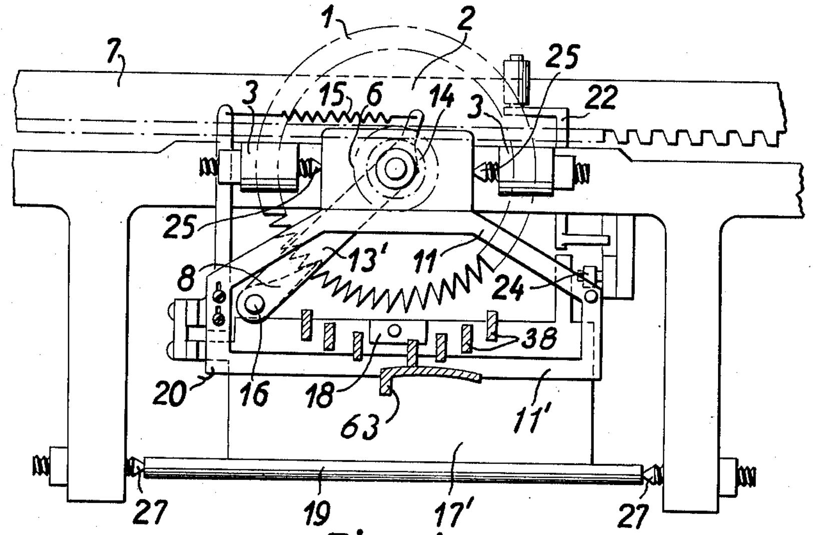
FIG. 4 is a front view of FIG. 3 from the right.
Figure 5:
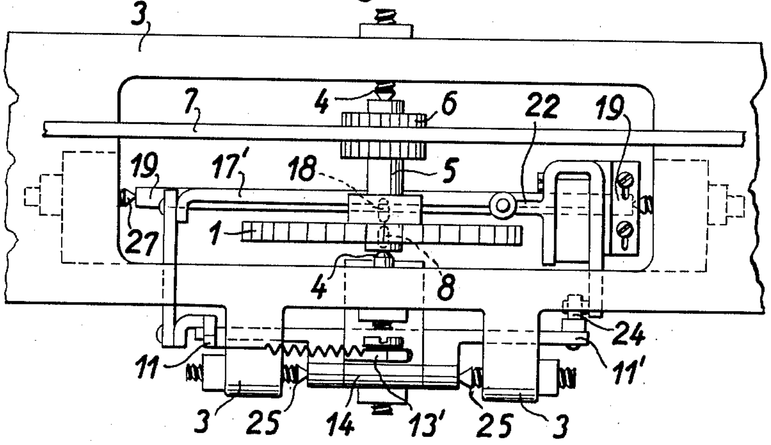
FIG. 5 is a plan view from above of the construction shown in FIGS. 3 and 4.

A modified form of mounting of the pawl and dog is illustrated in FIGS. 3 to 5. In FIGS. 1 and 2 the carrier 11 of the feed pawl 8 is pivoted on a spindle 10 at its lower end, and the carrier 17 of the dog 18 is journalled on 19 which is mounted on the carrier 11. In the modified embodiment shown in FIGS. 3–5, carrier 11' for bearing 14, arm 13 and feed pawl 8 is mounted in such a manner as to pivot on screws 25 fixed in the typewriter frame 3. The carrier 17' of the dog 18 is mounted on a shaft 19 between the ends of the screws 27 fixed in the frame of the typewriter. The movement in this case is easier, and fewer component parts are needed.

In both embodiments the pivot point of the feed pawl 8 coincides with the center of the escapement wheel 2, but according to this invention its movement is independent from it.

Figure 6:
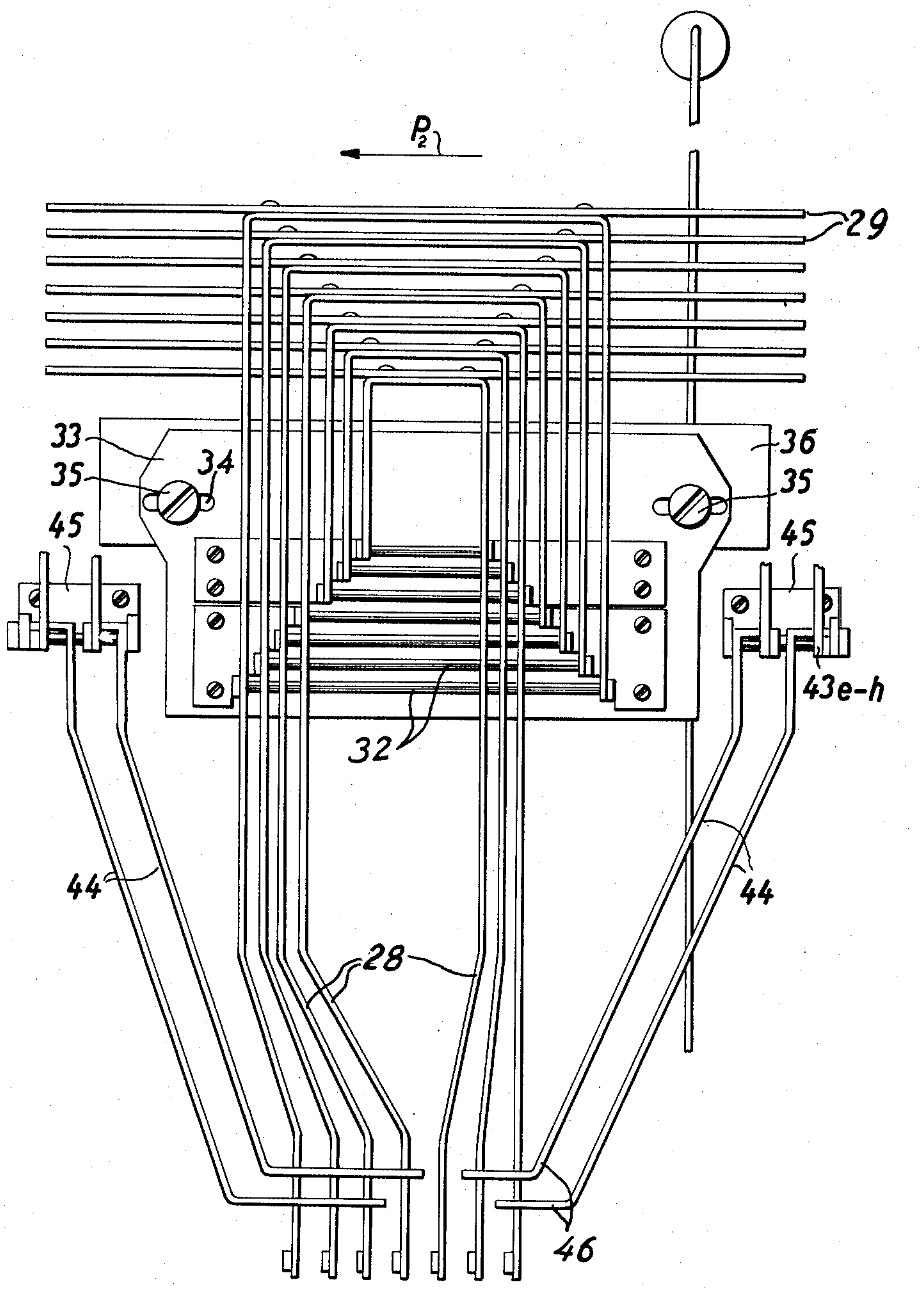
FIG. 6 shows the bridge member and the combs viewed from below.
Figure 7:
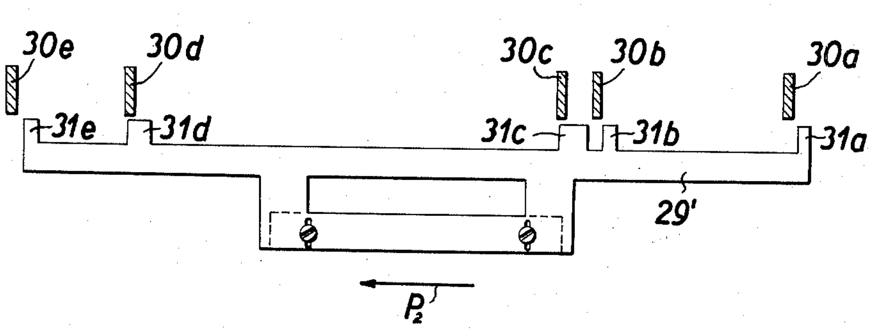
FIGS. 7 and 8 show a front view of a comb fixed to the bridge member in two different operational positions with a sectional view of the cooperating key lever.
Figure 8:
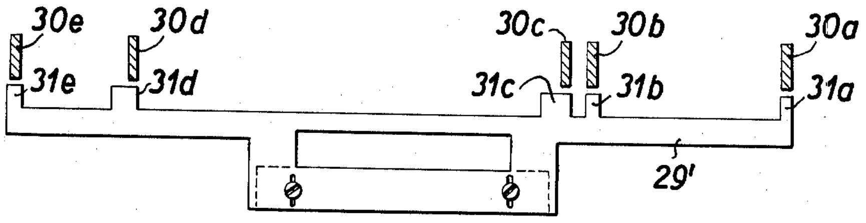
Figures 9, 10, 12:
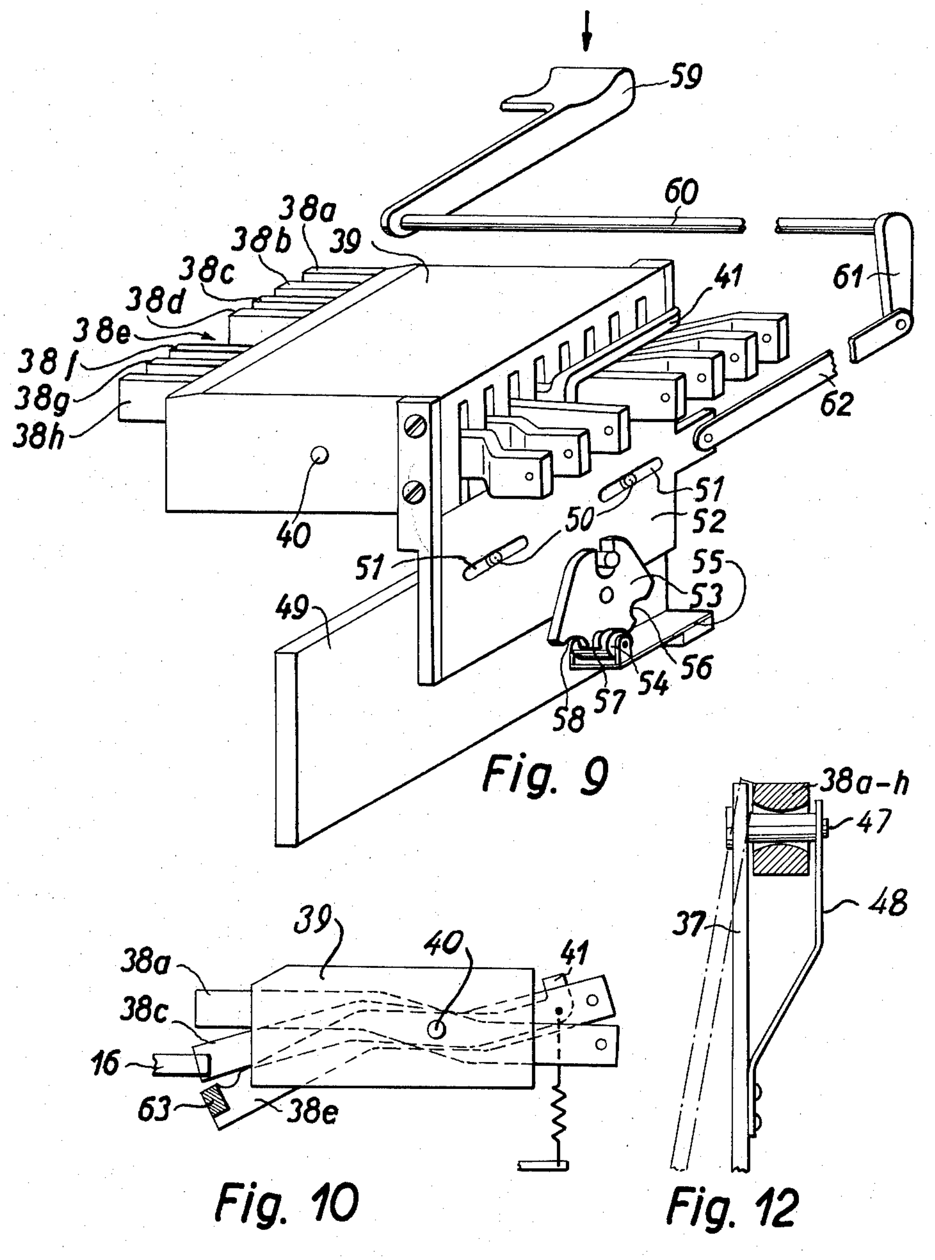
FIG. 9 illustrates the stops and their spacing device in a perspective view.
FIG. 10 is a side view of three stops.
FIG. 12 is an enlarged view of the journal of the bar adapted for the operation of the stops.
Figure 11:
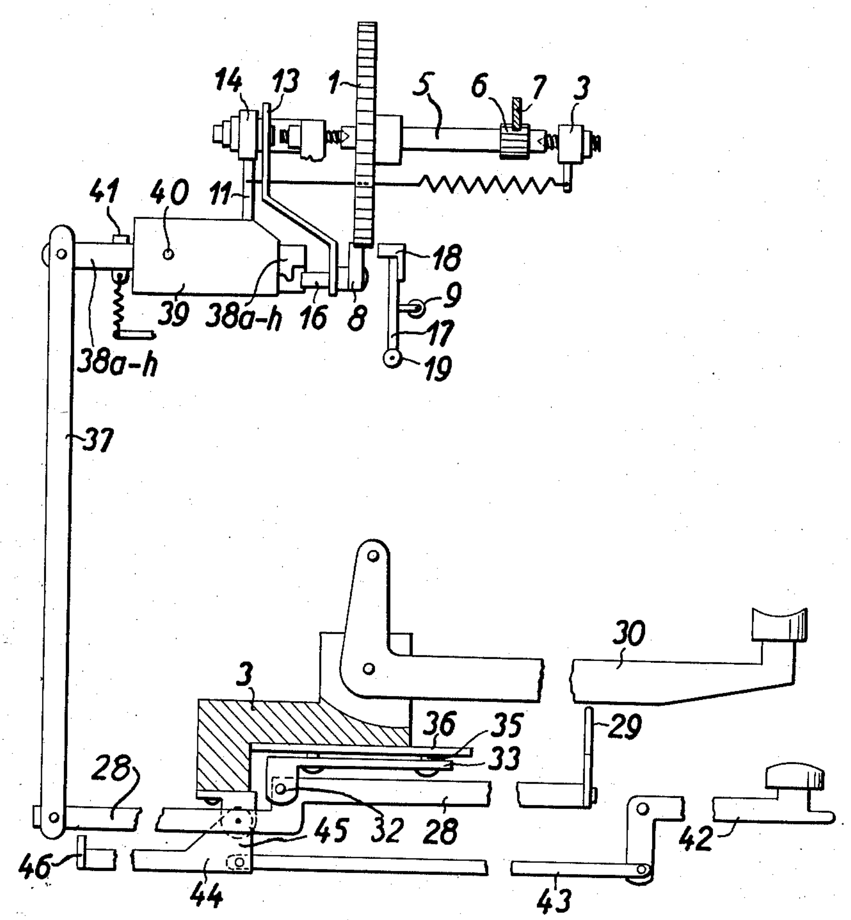
FIG. 11 is a side view of the principal parts of the device.

The amount of movement of the stop face 16 (see FIGS. 1 and 3) and therefore of the feed pawl 8 is determined by the bridge arrangement shown in FIG. 6 and of the stops shown in FIG. 9. In the illustrated arrangement there are 7 bridge members 28, each with a so-called comb 29 (FIG. 11). In FIGS. 7 and 8 there is illustrated by way of example comb 29' which is adapted for the advance of the rack by 6-unit widths.

Key lever 30 of the typewriter (FIG. 11) touches, when it is depressed, the prongs of the appropriate exchangeable comb 29 which in turn touches the key levers 30*a*—30*e*, thereby touching the prongs 31*a*—31*e* (FIGS. 7 and 8). Each key lever is conventionally arranged for typing of two letters, one of them with the other without depression of the shift key. Most of them require a different advance of the rack with the shift key depressed than without the shift key depressed, the majority of the letters being narrower than their respective capital letters.

FIG. 7 illustrates a comb 29' in its inoperative position. There are only two prongs 31*c* and 31*d* for the letters m, w, M, W, in register with the key levers 30*c* and 30*d*, respectively. If the shift lever is depressed, bridge members 28 (FIG. 6) are moved (by components not shown) in the direction of the arrow P2 until the prongs of comb 29' are moved into their operative position shown in FIG. 8. The prongs of some of the other combs are put out of their operative position, for example, the prong belonging to the letter *t* which has a two-unit width comes out of register with the prong for the letter T which has a 5-unit width. In this way prong 31*a* comes into register with key lever 30*a* when the shift key is depressed and the rack is advanced by 6- or 7-unit widths, for example, corresponding to the width of the depressed key representing the letter A. In the illustrated example, the levers 30*c* and 30*d* are for types which are of uniform width and represent the same width units whether the shift key is depressed on not. As can be seen from FIGS. 7 and 8, the key levers are in register with prongs 31*c* and 31*d* which are wider than the other prongs, whether the shift key is depressed or not.

The bridge members 28 are in the form of double crank levers, each provided with a pivot 32. The pivots 32 are fixed onto a plate 33 adapted for movement in a plane parallel to arrow P2 of FIG. 6. In order to make this movement possible, there is provided an elongated slot 34 on this plate 33 for pins 35 fixed to bracket 36 which, in turn, is fixed to frame 3 (FIG. 11).

At the inner end of each bridge member 28, as shown in FIG. 11, there is pivoted the lower end of the bar 37, the upper end of which is pivoted to one of the stops 38*a*–38*h* (FIG. 9). The stop face 16 cooperates with the appropriate stop as already explained. The stops are arranged for limited pivotal movement in block 39 by the pin 40. The illustrated embodiment allows for the use of nine different widths. The stops 38*a*–38*d* are adapted for 9-, 8-, 7-, 6-unit widths, respectively. In the preferred embodiment, 5-unit widths represent the normal width, which comprises most types (letters). The stop 38*e* is herefore represented in its inoperative position, that is its working position, for simplicity's sake. When a bridge member operating one of the stops 38*a*–38*d*, representing a larger width, is actuated, the stop 38*e* is moved from its working position by its crank lever 41 (see FIGS. 9 and 10), and its place is taken by another stop 38*d*. The stop 38*e* remains in its working position when one of the stops 38*f*–38*h*, representing less than 5-unit widths, is moved into the working position, because each of the stops 38*f*–38*h* can move into its operative position in front of the operative position of the stop 38*e* and is therefore not influenced by the stop 38*e* (see FIG. 2 or 4).

The bridge members 28 can be operated by one of the five space keys 42 as well as by the key lever 30 (see FIG. 11). Each of the space keys is connected for this purpose to a lever 44 by a link 43. Each lever 44 is pivoted on a bracket 45 fixed to the frame 3 and is provided with a protrusion 46 which can be brought into contact with the underside of a bridge member 28 near the bar 37. The bars 37 can in this way be lifted by the depression of one of the space keys 42 in the same way as by the depression of a key lever 30. A selective word spacing can thus be obtained.

When the shift key is actuated for letters of different widths, capital letters being wider than normal letters, the shift key moves all the bridge members sideways (in a manner not illustrated), so that the key lever 30 comes into register with the appropriate prongs 31 of a comb 29. This side movement measures only a few millimeters, and to make this possible, there is provided a lateral pivoting device for the bars 37 at their upper ends, as illustrated in FIG. 12. The bore for pivot pins 47 of bars 37 in each stop 38 is not cylindrical but enlarged on each end. The pivot pin 47 is retained in its bearing by the leaf spring 48.

The typewriter comprises a further "unit key" by which the stop 38*h* can be operated (in a manner not illustrated) so that the rack can be advanced for special purposes by one unit, that is by about 0.38 mm.

The invention further comprises the special spacing device illustrated in FIG. 9 which enables additional spacing in a more exactly dimensioned manner than was possible heretofore. It is adapted to increase the spacing between letters during typing without the use of a space key. Pins 50 screwed into bracket 49 pass through slits 51 of bracket 52. The block 39 secured to bracket 52 can, as illustrated, be moved over two unit widths. In the position shown, the letter spacing of stops 38*a*–38*h* is increased by one unit. The segmented adjusting plate 53 is held in the selected position by roller 54 biased against one of the indentations 56–58 of the adjusting plate 53 by a leaf spring 55. When the adjusting plate 53 is moved by operation of the lever 59 through the linkage 60, 61, 62, so that roller 54 registers with indentation 58, no increased spacing occurs and this is the normal position. On the other hand, the spacing is increased by two unit widths for every key lever or space key depression when the roller 54 registers with indentation 56.

The stop 38*e* is provided with an angle piece 63 at its end opposite its crank lever 41 (FIG. 10) so that stop face 16 is not trapped between stops 38*a*–38*d* when any of the stops 38*a*–38*d* are in operation (FIG. 2).

Having described my invention, I claim:

1. In a typewriter with keys for letters and spaces disposed in a frame, an escapement wheel provided with teeth of predetermined pitch, a shaft mounted in said frame and on which said escapement wheel is fixedly mounted, a pawl carrier, means pivotally mounting said carrier in said frame adjacent to and independent from said escapement wheel for movement toward and from said escapement wheel, a pawl member, means pivotally mounting said pawl member on said pawl carrier for engaging the teeth of said escapement wheel, means biasing said pawl carrier toward said escapement wheel to hold said pawl member in engagement therewith whereby and only during said engagement will said pawl member pivot means be substantially aligned with said shaft, a dog carrier, means pivotally disposing said dog carrier in said frame adjacent to said pawl carrier, a spacing member disposed between said pawl carrier and dog carrier, a dog member disposed on said dog carrier, selectable stop members disposed adjacent said pawl member against which said pawl member abuts, means to maintain said pawl member against said stop members, selectable means operatively connected to said stop members to select same for appropriate stopping of said pawl member, and means for pivoting said dog carrier so that said dog carrier engages said spacing member, thereby to free said pawl member from said escapement wheel.

2. A typewriter according to claim 1 in which said spacing member is mounted on said pawl carrier and further including means for adjusting said spacing member with respect to said dog carrier.

3. A typewriter according to claim 1 in which means are provided for said selectable stop members for pivotally mounting the same in a block member disposed in said frame, and a spacing device is operatively connected to said block member to move same to increase the spacing between letters.

4. A typewriter according to claim 1 in which a rack release lever is pivotally mounted on said frame adjacent said dog carrier and pawl carrier, said rack release lever carrying a pivoted lever which includes a first portion for engaging said pawl carrier and a second portion for engaging said dog carrier to free said escapement wheel in order to move same to any desired position.

5. A typewriter according to claim 1 in which said selectable means include bridge members pivotally connected to said frame, bar members pivotally connected between said stop members and one end of said bridge members, comb members having prongs thereon disposed on the other end of said bridge members, key levers pivotally disposed on said frame above said comb members to engage the prongs thereon upon movement of said key levers thereagainst, and space key means including a portion for engaging said bridge members to pivotally move same upon movement of said space key means.

References Cited in the file of this patent

UNITED STATES PATENTS

| | | |
|---|---|---|
| 342,352 | Hall | May 25, 1886 |
| 616,451 | Brown | Dec. 27, 1898 |
| 851,504 | Drewell | Apr. 23, 1907 |
| 2,111,410 | Stickney | Mar. 15, 1938 |
| 2,167,812 | Muller | Aug. 1, 1939 |
| 2,202,565 | Reid | May 28, 1940 |
| 2,284,702 | Webb | June 2, 1942 |
| 2,831,558 | Toggenburger | Apr. 22, 1958 |